US009494937B2

(12) United States Patent
Siegel et al.

(10) Patent No.: US 9,494,937 B2
(45) Date of Patent: Nov. 15, 2016

(54) METHOD AND SYSTEM FOR DRONE DELIVERIES TO VEHICLES IN ROUTE

(71) Applicant: HTI, IP, L.L.C., Arlington, VA (US)

(72) Inventors: Robert S. Siegel, Atlanta, GA (US); Stephen Christopher Welch, Atlanta, GA (US); James Ronald Barfield, Jr., Atlanta, GA (US)

(73) Assignee: Verizon Telematics Inc., Atlanta, GA (US)

( * ) Notice: Subject to any disclaimer, the term of this patent is extended or adjusted under 35 U.S.C. 154(b) by 140 days.

(21) Appl. No.: 14/310,261

(22) Filed: Jun. 20, 2014

(65) Prior Publication Data

US 2015/0370251 A1 Dec. 24, 2015

(51) Int. Cl.
| | |
|---|---|
| *G05D 1/00* | (2006.01) |
| *B64C 31/02* | (2006.01) |
| *B64D 1/08* | (2006.01) |
| *B64D 1/22* | (2006.01) |
| *G05D 1/10* | (2006.01) |
| *G06Q 10/08* | (2012.01) |
| *G01C 21/20* | (2006.01) |
| *G01C 21/34* | (2006.01) |
| *B64C 39/02* | (2006.01) |

(52) U.S. Cl.
CPC .......... *G05D 1/0027* (2013.01); *B64C 39/024* (2013.01); *B64D 1/08* (2013.01); *B64D 1/22* (2013.01); *G01C 21/20* (2013.01); *G05D 1/00* (2013.01); *G05D 1/101* (2013.01); *B64C 2201/128* (2013.01); *B64C 2201/146* (2013.01); *G01C 21/3438* (2013.01); *G06Q 10/083* (2013.01)

(58) Field of Classification Search
CPC .......... G06Q 10/083; B64C 2201/128; B64C 39/024; G01C 21/20; G05D 1/00; G05D 1/101

See application file for complete search history.

(56) References Cited

U.S. PATENT DOCUMENTS

| 8,178,825 B2 * | 5/2012 | Goossen | F41G 7/303 244/3.1 |
|---|---|---|---|
| 2012/0030133 A1 * | 2/2012 | Rademaker | G06Q 10/08 705/333 |
| 2013/0240673 A1 * | 9/2013 | Schlosser | G05D 1/101 244/137.1 |
| 2015/0120094 A1 * | 4/2015 | Kimchi | B64C 39/024 701/3 |
| 2015/0332206 A1 * | 11/2015 | Trew | G06Q 10/0836 705/330 |

\* cited by examiner

*Primary Examiner* — Yonel Beaulieu
*Assistant Examiner* — Thomas Ingram

(57) ABSTRACT

A system comprise a server configured to communicate vehicle information with a vehicle transceiver of a vehicle moving along a vehicle route and communicate drone information with a drone transceiver of a drone moving along a drone route. A computing device with a memory and a processor may be configured to communicatively connect with the server, process the vehicle information and the drone information, identify a plurality of pickup locations based in part on the vehicle information and drone information, select at least one of the plurality of pickup locations based in part on a priority score associated with a travel time to or wait time for each of the plurality of pickup locations, and update the drone route based in part on the selected pickup location.

18 Claims, 9 Drawing Sheets

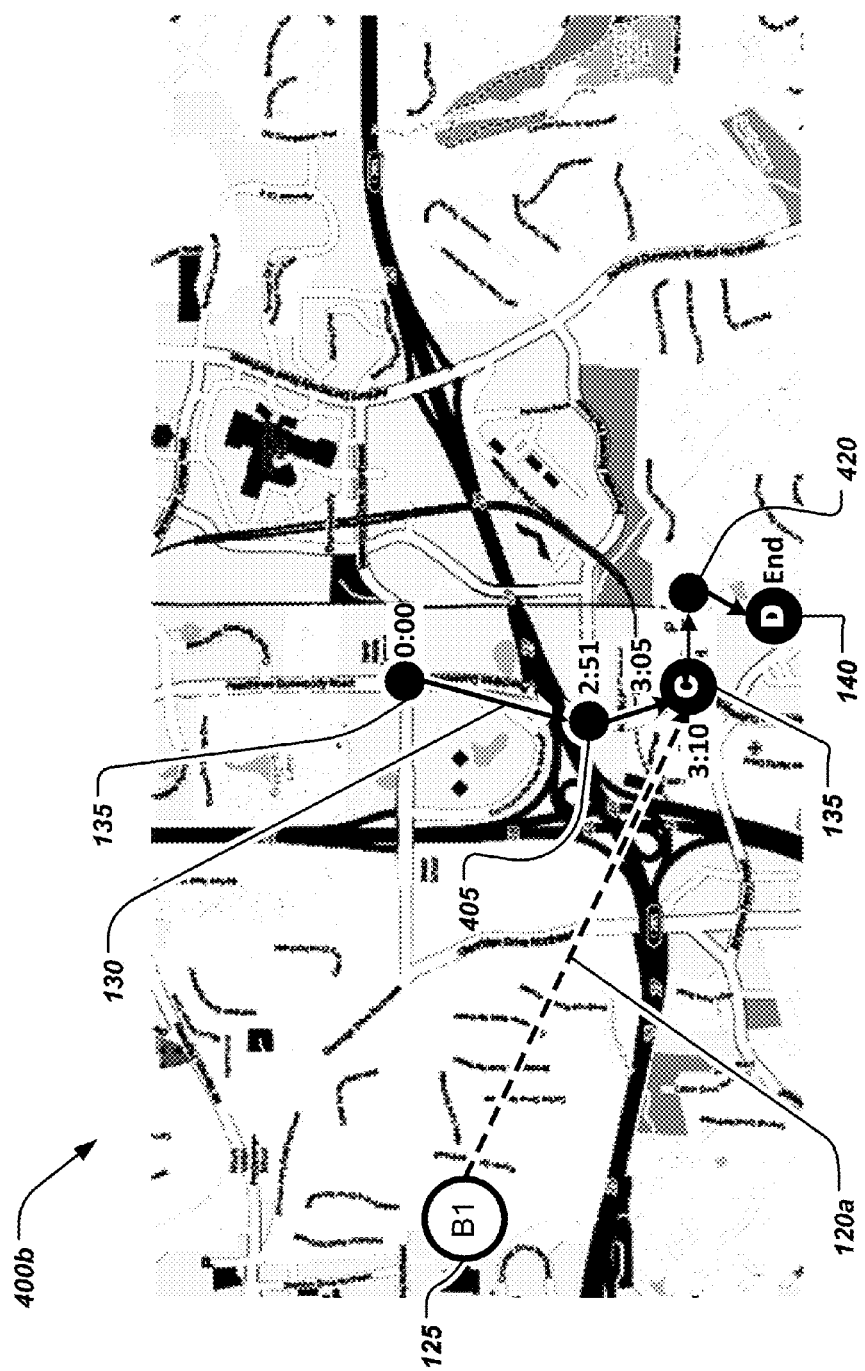

METHOD AND SYSTEM FOR DRONE DELIVERIES TO VEHICLES IN ROUTE

BACKGROUND

Flying drones are becoming more prevalent. Drones may include any unmanned aircraft or self-driving vehicles. Drones may take on many different configurations. An exemplary drone may include a multi-propeller helicopter configuration or an airplane configuration. Drones may range in size from palm-sized to several feet or larger. Drones may be utilized for their ability to take off and land in small spaces. Drones may also be capable of carrying small amounts of cargo and may provide remote sensor information. As the regulation of flying drones becomes more defined, drones are likely to have an increased role in society and commerce.

To facilitate commercial viability, drone routing systems may be configured to safely and efficiently route drones. Unmanned land-based or aerial vehicles may be useful for delivering and collecting consumer goods, distributing goods to resellers, repair services, moving people between locations, and emergency applications. A broad and diverse range of factors may be relevant in determining optimal drone paths with respect to physical obstacles, environmental conditions, fuel costs, and drone objectives. Relevant factors may be predetermined, static, or dynamic, e.g., evolving over time. It may be desirable to provide centralized drone routing based on a variety of relevant factors. It may also be desirable to provide a drone and autonomous vehicle routing marketplace, where fleet operators can effectively leverage their resources while optimizing revenue or profit.

BRIEF DESCRIPTION OF THE DRAWINGS

FIG. 5B is a map showing the flight path for the drone to rendezvous with the vehicle, for example, to deliver cargo;

DETAILED DESCRIPTION

A vehicle may use a drone and a communications network such as a cellular communication network to keep the drone and vehicle in real-time or near real-time communication over extended distances and to facilitate the drone autonomously carrying out objectives provided by a user such as a vehicle occupant. One convenience that a drone may provide could include flying ahead of the vehicle and reporting on traffic information such as upcoming conditions such as weather or traffic scenarios. Another convenience that a drone may offer may include the transportation of cargoes such as, for example, the retrieval of cargo (e.g., by flying to a restaurant to retrieve food or drink such as coffee) and delivery the cargo (e.g., to the vehicle).

The vehicle and the drone may utilize any number of communication technologies, for example long-range or coarse-grain communication and short-range or fine-grain communication. The coarse-grain communication may utilize transceivers (e.g., as part of the drone, vehicle, and network) to communicate with the network to determine and report the location of the vehicle and drone. The fine-grain communication may utilize the same or separate transceivers (e.g., as part of the drone and vehicle) to provide direct communication between the vehicle and drone. The system may provide location information of the vehicle and drone relative to each another and in association with a common frame of reference. For example, a radio resource location services (LCS) protocol (RRLP), or other multilateration, trilateration or triangulation techniques, may be used to determine coarse-grain location information. Alternatively, the communication network may use multilateration to determine the vehicle and the drone location, and then may report one or both locations to the drone and vehicle. By way of further illustrative example, a separate satellite-based positioning system may be utilized (e.g., Global Positioning System (GPS) or global satellite navigation system (GLONASS)), which may be provided as part of the LCS and RRLP to provide coarse grain location information. In addition, the drone, vehicle, and network may be configured to communicate location information to any number of remote devices (e.g., servers, drones, and vehicles), for example, using a remote network (e.g., a cellular or wireless network).

The drone delivery system may include one or more computing systems that may each include a memory and a processor. The processor may use the location information along with a vehicle navigation route to plan a flight path of a drone. The processor may instruct the drone to collect information or to transport cargo.

Figure 1:
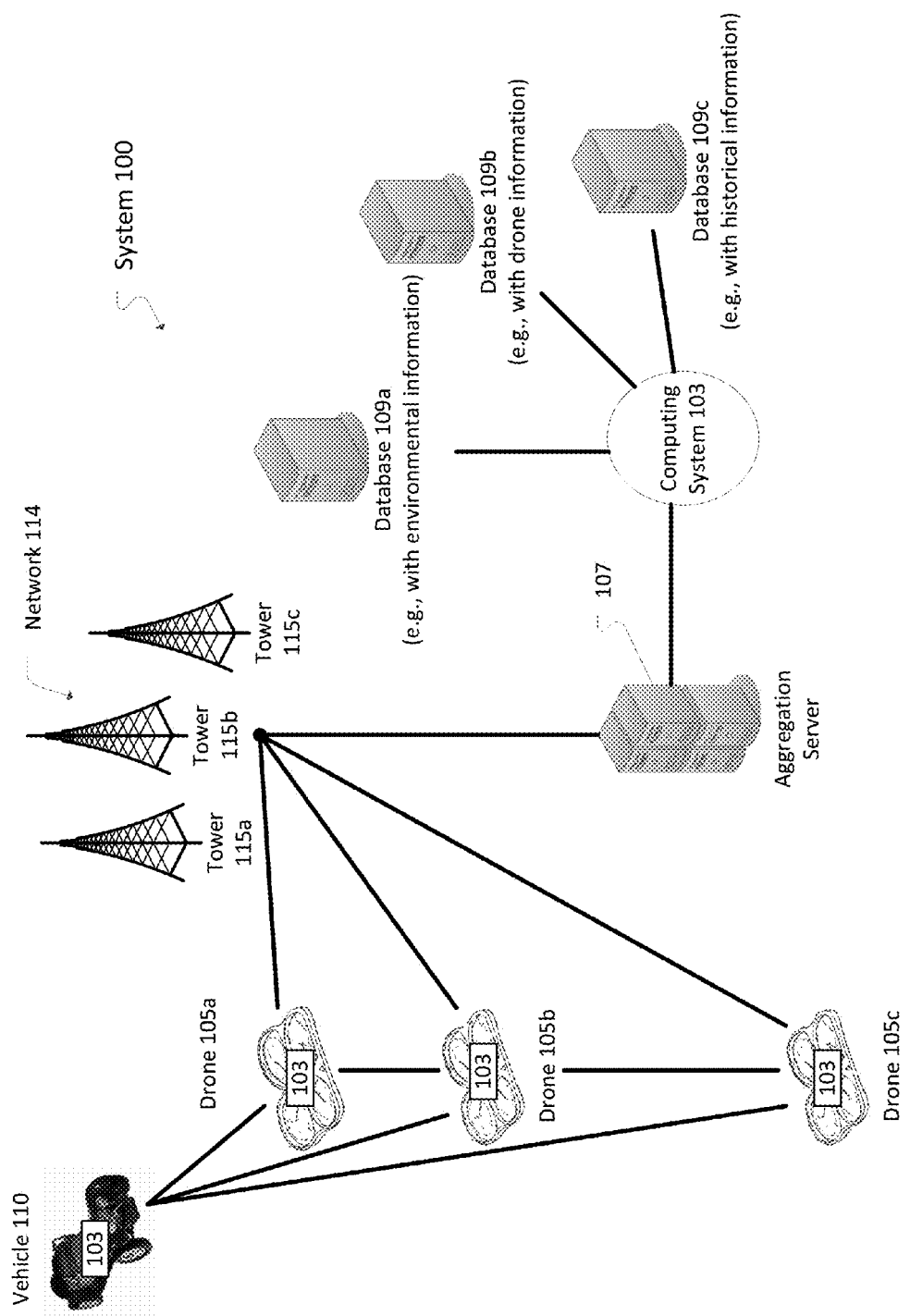
FIG. 1 illustrates an exemplary drone delivery system of the present disclosure.

FIG. 1 illustrates an exemplary drone delivery system 100 having a computing device 103, a drone 105, an aggregation server 107, a database 109, a vehicle 110, and a network 114. The drone 105 and vehicle 110 may include a computing system 103. The system 100 may include any number of drones 105, e.g., a drone 105*a*, a drone 105*b*, and drone 105*c*. The database 109 may include any number of databases, e.g., a database 109*a* (e.g., with environmental information), a database 109*b* (e.g., with drone information), and a database 109*c* (e.g., with historical information). As described in more detail below, network 114 may include a cellular network represented in part by a plurality of towers 115 (e.g. towers 115*a*, 115*b* and 115*c*). The drone delivery system 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

As illustrated in FIG. 1, the drone delivery system 100 may include a drone 105 and a vehicle 110. Drone 105 and vehicle 110 may be in real-time or at least near real-time communication with the network 114. In addition, the drone 105 and vehicle 110 may be in direct communication with each other. For example, drone 105 and vehicle 110 may utilize network 114 for coarse-grain communication and direct communication for fine-grain communication.

The system 100 may be configured as a centralized drone routing system. Drones 105 may include aerial drones, driverless vehicles, or other forms of transportation. Drones 105 may be connected to aggregation server 107 through cellular connection, or other wireless communication protocol. Aggregation server 107 may be configured to collect data from drones 105 as well as sending instructions to drones 105. Aggregated drone data from aggregation server 107 may be processed and optimized by computing system 103. The computing system 103 may utilize of other data sources, such as environmental data (e.g. weather conditions), drone data, and historical data (e.g. previously collected drone data).

Computing system 103, as described in further detail below, may be configured to utilize one or more cost functions. A cost function may assign a specific cost to a route for a particular drone 105. Inputs to a cost function may include a distance of a drone 105 to environmental obstacles (e.g., tall buildings or power lines), the distance between the drone 105 being routed and other drones 105, the fuel required, the time required, and the relative priority of the drone mission. Further, a cost function may be subject to specific constraints. For example, a minimum distance between the drone 105 and high human traffic areas may be utilized by computing system 103.

A route may indicate a specific path in a three-dimensional space between a starting point and a destination. Further, a route may include a specific departure time, velocity, and may include pauses or waiting periods. Routes may then be determined by minimizing the cost function of each drone. As infinite routes for a drone 105 may be possible, steps may need to be taken to reduce the computational complexity of the problem. Computations may be accelerated by optimization methods such as gradient decent. Further, heuristics may be used to constrain the number of potential routes (for example, drones may be confined to discrete heights, such as 100, 200, and 300 feet above the ground). Computations may further be accelerated by seeding or starting a given optimization algorithm with historical, or human-determined routes.

Individual cost functions for each drone 105 may be minimized in a "greedy" fashion by finding the preferred path for a drone 105, and subsequently finding the preferred path for another drone 105, potentially making no changes to the path of the first drone. This method may be continued until all drones have been routed. Drones with more important or higher priority missions may be routed first. This "greedy" approach may not result in a preferred routing for all drones 105. Alternatively, drones 105 may be routed collectively by minimizing the sum of all drone cost functions simultaneously. Certain drones 105 may be assigned higher priority, and these costs functions may be assigned a higher weight in the summation. Routes for drones 105 may then be determined by optimization methods such as gradient decent, and heuristics such as those discussed above may be used to reduce the complexity of the problem. Specific methods may be added to remove drones from the flight paths of emergency aerial vehicles, such as medical helicopters.

Network 114 may include any network that provides the infrastructure through which the drone 105 and vehicle 110 may communicate. For instance, network 114 may be an infrastructure that generally includes edge, distribution, and core devices and enables a path for the exchange of information (e.g., drone, vehicle, traffic and cargo information) between different devices and systems (e.g., drone 105 and vehicle 110). Network 114 may include a telematics server, a communications network server, a government entity server, a cloud-based server, or any other device configured to communicatively connect with network 114 to facilitate communications between drone 105 and vehicle 110. In general, a network (e.g., network 114) may be a collection of computers and other hardware to provide infrastructure to establish connections and carry communications.

Further, network 114 may utilize one or more networks with any networking technologies. Network 114 may include any wireless network. The network may include a packet network or any other network having an infrastructure to carry communications. Exemplary networks may include one or more of a cellular network, telephone network, global area network, wide area networks, a VoIP network, a VoLTE (Voice over LTE) network, fiber optic network, cable network, television network, local area networks (e.g., Ethernet), wireless local area networks (e.g., radio-frequency (RF) or Wi-Fi), power-line networks, or combinations thereof. Network 114 may represent a single network, a combination of different networks components and technologies, and/or a plurality of networks, as described above.

Network 114 may include any number of towers 115 (e.g., towers 115a-c). Towers 115 may be tall structures designed to support antennas or aerials for telecommunications amongst the system 100. Towers 115 may enable connections that complete communication paths that carry signals to and/or from the system 100. For instance, a first connection may complete a communication path from drone 105 to network 114. Further, a second connection may complete a communication path from vehicle 110 to network 114.

Figure 2:
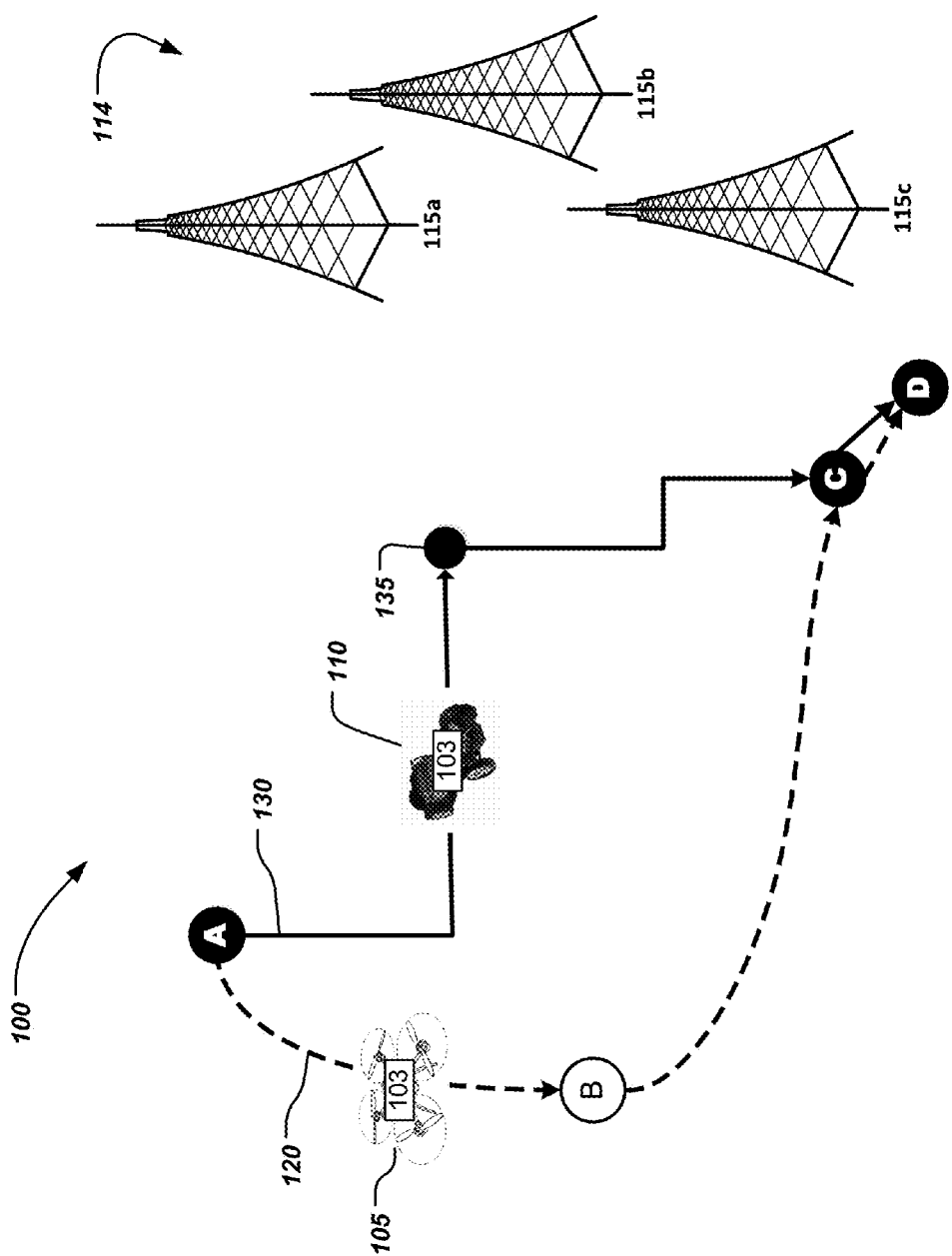
FIG. 2 illustrates an exemplary drone delivery system, for example, including a route.

FIG. 2 illustrates an exemplary drone delivery system 100 configured for routing of a drone 105. The drone delivery system 100 may take many different forms and include multiple and/or alternate components and facilities. While an exemplary system 100 is shown in FIG. 2, the exemplary components illustrated in FIG. 2 are not intended to be limiting. Indeed, additional or alternative components and/or implementations may be used.

As shown in FIG. 2, the system 100 may be provided with an objective, for example, to retrieve cargo (e.g., coffee from a coffee shop) or provide information to vehicle 110 (e.g., fly ahead of the vehicle to provide traffic information). The drone 105 may start from a location "A" or origination point, for example, a docking station associated with vehicle 110 or a home base remote from the vehicle. Drone 105 may launch from location "A" and, while in periodic or continuous communication with network 114, move to a remote location "B" along a path 120, for example, to a cargo location or traffic location. At remote location "B", the drone 105 may complete a task, for example picking-up cargo or obtaining traffic information. Then the drone 105 may continue to fly along the path 120 to location "C" or a rendezvous point with the vehicle 110, which may approximate a route 130 of vehicle 110 passing through location 135. At or near location "C," drone 105 and vehicle 110 may utilize direct communication for fine-grain communication, for example, to facilitate information transfer or positioning of drone 105 with respect to vehicle 110. The paths of vehicle 110 and the drone 105 may converge and connect at location "D" or a destination point, for example, as the drone 105 reattaches to the vehicle 110 to recharge an energy store or deliver the cargo. As drone 105 and vehicle 110 approach location "D," the relative positions and speeds of both the drone 105 and vehicle 110 may converge to permit engagement (e.g., docking) at location "D".

The vehicle 110 may include any transport vehicle, for example any land-based or water-based mechanism (e.g., a car or boat). The vehicle 110 may include and incorporate a drone docking station to which the drone 105 may selectively attach and detach. The docking station may be integral with the vehicle 110 or associated with a separate mechanism associated with the vehicle (e.g., a portable docking station that may be moved from vehicle to vehicle). The vehicle 110 may also include a transceiver (e.g., a cell phone), as described in further detail below, that may permit two-way communication and associated control over the drone 105 using network 114.

Vehicle 110 or the drone docking station may include a charger to allow the energy store on the drone to be recharged, refueled, or swapped. The energy store may be a battery or a fuel source, such as gasoline, model airplane fuel, remote control helicopter fuel etc. The energy store may be recharged using direct or inductive charging. Swapping of the energy store may be achieved by switching a used battery for a charged battery or swapping an empty fuel container for a full fuel container.

The drone 105 may include any type of transport configured to fly. For example, drone 105 may include a helicopter with two, three, four, or more propellers. The drone 105 may be a small airplane with propellers and wings. Furthermore, drone 105 may be a winged aircraft powered by compressed gas, rocket power, or jet propulsion. The drone 105 could be a lighter than air flying objects such as a dirigible. In addition, the drone 105 may have various sensors 235, for example vision systems, proximity sensors, light detection and ranging ("LIDAR") sensors, etc.

Alternatively, the drone 105 may be launched from a remote home base (e.g., a physically fixed location such as a land-based commercial business or a larger flying station or dirigible) and fly to pick-up some cargo, which it then carries to vehicle 110. Alternatively, the drone 105 may depart from its home base already loaded with the cargo. In either case, the drone 105 may rendezvous with the vehicle 110 to deliver the cargo. In such a situation, a docking station associated with vehicle 110 as well as the use of network 114 may be helpful so that real-time or near real-time communication may be maintained between the drone 105 and vehicle 110.

The drone 105 may start on the vehicle or from a home base. For example, the drone may launch from a trunk of vehicle 110 or from a compartment within the vehicle 110. The drone 105 may launch while vehicle 110 is driving on a road or intermittently moving in slow or "stop-n-go" traffic. The drone 105 may fly along a flight path by elevating to a height above vehicles, road signs, and bridges. Further, the flight path may follow a path of the road. In addition, drone 105 may fly at a predetermined height above ground level, for example the United States Federal Aviation Administration's ceiling of 400 feet, which may change over time.

In addition, the drone delivery system 100 may use vehicle location information to detect the drone 105 to rendezvous with the vehicle 110, the drone 105 may utilize fine-grain communication, for example using multilateration or triangulation of short range wireless transmitters, magnetometers, laser guides or LIDAR (LIght Detection And Ranging) technologies, radar guidance, ultrasonic sensors, light based sensors, or any other devices configured to provide relative or global positioning feedback such that the drone can approach, land on or in, or attach or dock with respect to vehicle 110. Furthermore, the drone 105 may have a pressure sensor to measure altitude.

When the drone 105 is following a flight plan it may have sensors to detect local obstacles and avoid collision and then returned to the flight plan. For example, the drone 105 may have a vision system to see obstacles or laser range finders to determine a distance to obstacles. The drone 105 may have a laser-based scanning system that detects objects and their distance and velocity so the drone may determine a path to take to avoid such obstacles. Some or all of the collected information may or may not be communicated to vehicle 110 depending on the amount of autonomy associated with the operation of drone 105. The drone may also incorporate a video system capable of streaming video directly to the vehicle 110 via fine-grain (e.g., wireless) communication or coarse-grain (e.g., cellular) communication, for example, to obtain traffic information.

Figure 3:
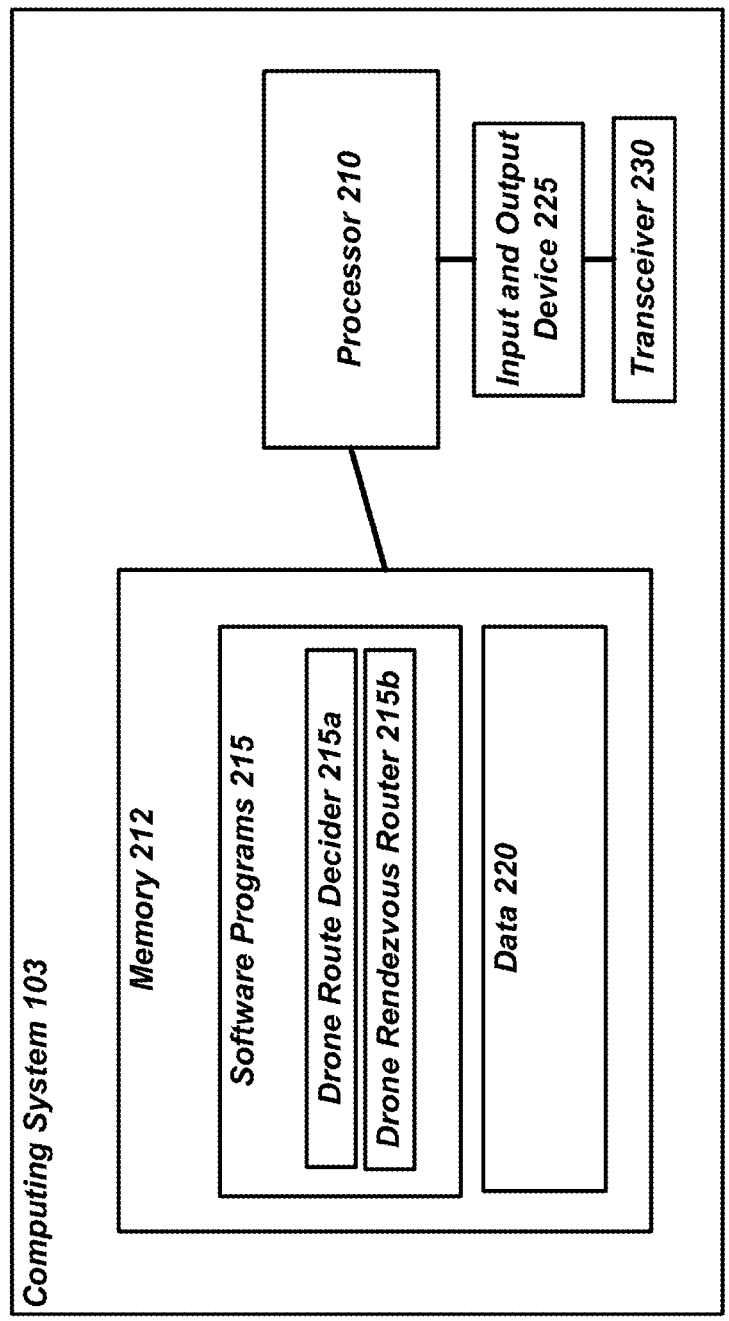
FIG. 3 illustrates a exemplary computing device.

FIG. 3 illustrates a block diagram of a computing system 103 of system 100. The computing system 103 may include a processor 210, memory 212, input and output device 225, and a transceiver 230. Memory 212 may include software programs 215 and data 220. Software programs 215 may include drone route decider 215a and drone rendezvous router 215b. Input-output devices 225 may be operatively connected to one or more transceivers 230.

Any portion of system 100 (e.g., drone 105, vehicle 110, and towers 115) may include computing system 103. Moreover, portions of computing system 103 may be distributed among various system components (e.g., the drone 105, vehicle 110, and towers 115) or network 114. For example the programs 215 may have some of the described functionality running on any or all of drone 105, vehicle 110 and towers 115.

Memory 212 may include software programs 215 and data 220. Software programs 215 may include navigation programs, routing algorithms (e.g., specific routing algorithms described below), and the like. Data 220 may include environmental, drone specific, and historical information, as mentioned above. Data 220 may further include logistic and map data as well as vehicle, traffic, and cargo information. The software 215 and data 220 may be loaded through the input-output 225. Although these software programs are shown to be in the same computing system 103 and the same memory 212, they could be located on any number of computing devices.

The software programs 215 may include a drone route decider program 215a and a drone rendezvous router 215b. The programs may be standalone programs or integrated parts of a central software program. The software programs contain instructions that are run on the processor 210 to cause the computing system 103 to perform the necessary interactions with the physical components discussed above to carry out the tasks necessary for there to be appropriate interaction between drone 105 and vehicle 110 as well to permit the drone to complete its objective.

System 100 (e.g., drone 105, vehicle 110, and tower 115) may include one or more transceivers 230, for example, as part of computing system 103. Transceiver 230 may communicatively connect the devices of system 100, for example, using any type of wireless connection. The wireless connection may utilize a wireless transmitter (e.g., cellular, radio-frequency or Wi-Fi transmitter) of transceiver 230. Transceiver 230 may be configured to communicatively connect drone 105 and vehicle 110 using a wireless signal. Transceiver 230 may be used for digital or analog signal transfers. For instance, transceiver 230 may include any antenna technology including cellular, radiofrequency (RF), near field communication (NFC), Bluetooth®, Wi-Fi, or the like. Transceiver 230 may include any technology that implements a wireless exchange of data by converting propagating electromagnetic waves to and from conducted electrical signals. Transceiver 230 may include any technology that is used to exchange data wirelessly using radio waves over a radio range or network that enables communication.

Transceiver 230 may also include a location determination technology that enables the determination of a current geographic position such as an asset location. Examples of location determination technology may include, without limitation, global positioning systems (GPS), local positioning system, and mobile phone tracking. Transceiver 230 may be configured to determine a drone location and a vehicle location. Transceiver 230 may be configured to exchange the drone location and vehicle location between drone 105 and vehicle 110. Transceiver 230 may also be configured to exchange drone location and vehicle location with network 114.

For example, transceivers 230 may be part of drone 105, vehicle 110, and towers 115, for example, to communicate information between drone 105, vehicle 110, and towers 115. Furthermore, transceiver 230 (e.g., as part of drone 105 and vehicle 110) may include a coarse-grain transceiver and a fine-grain transceiver, which may be part of the same transceiver 230 or separate transceivers 230. The coarse-grain transceiver may be configured for wireless (e.g., cellular) communication with network 114. The fine-grain transceiver may be configured for direct wireless (e.g., RF) communication between drone 105 and vehicle 110. For instance, if transceiver 230 (e.g., as part of drone 105) beyond a range of fine-grain communication (e.g., with vehicle 110), transceiver 230 may utilize coarse-grain communication with network 114 (e.g., to control drone 105).

Transceivers 230 may provide communication between drone 105, vehicle 110, and network 114. The same or a secondary transceiver 230 may allow direct communication between drone 105 and vehicle 110. Transceivers 230 may utilize a global satellite navigation system such as GPS from the United States, GLONASS from Russian, and GNSS from European Union. These satellite-positioning systems may be coupled with a map-based navigation system that may provide estimates for time of arrival the closest nodes within a geographical distance threshold to the drone.

In general, computing systems and/or devices, such as computing system 103, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the computing system 103 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 4:
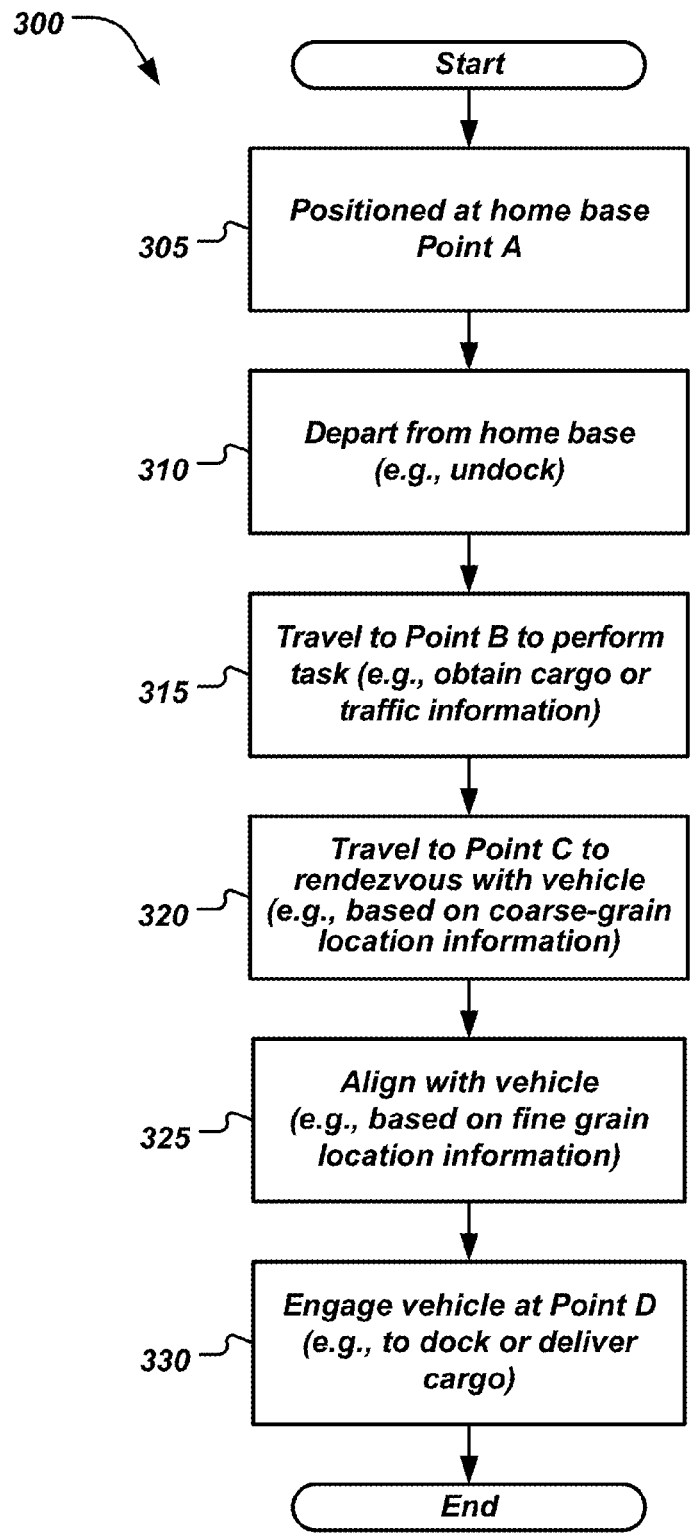
FIG. 4 is a flowchart of an exemplary process for the drone delivery system.

FIG. 4 is a flowchart of an exemplary process 300 that the drone delivery system 100 may use to carry out an objective.

At block 305, the drone delivery system 100 may start with the drone 105 at position "A." Where point "A" may be a vehicle 110 or a home base for example a retail establishment such as a coffee shop, or a drone delivery service that has a home base that is either located on the ground or a larger flying structure that has numerous drone docking stations and is positioned appropriately for the drone delivery pattern expected for that time of day.

At block 310, the drone delivery system 100 may instruct the drone 105 depart from point "A."

At block 315, the drone 105 travels to point "B" to carry out the objective, for example, to pick-up cargo (e.g. coffee) or obtain traffic information (e.g. flying ahead of the vehicle 110 to look at and assess and report on the traffic ahead).

At block 320, the drone 105 travels 2 point "C" using the coarse grain location information, as discussed above, for example to reach the rendezvous location.

At block 325, the drone 105 may use fine-grain location information to align and converge with the path of vehicle 110, as discussed above.

At block 330, the drone 105 has completed alignment and is able to engage with vehicle 110 or a drone docking station.

Drone delivery system 100 may utilize a number of additional features to facilitate the positioning of drone 105 and recovery of data 220, for example traffic information. Drone 105 may include a camera to provide real-time or near real-time pictures or video streams using transceiver 230. This may allow vehicle occupants (e.g. driver and passengers) to access the video via a display screen in the vehicle or on their cell phones. The display and related input/output devices 225 such as keyboards, audio input mechanisms and the like may be directly associated with computing system 103 or separate, but in communication with such a device. The drone user is able to signal to the drone to continue flying forward to send back traffic information, for example, a video stream of the traffic situation from the drone's point of view. The video enables the drone user (e.g. driver) to make a more informed decision regarding the traffic situation and potential alternatives. Furthermore, the video feed may be analyzed to determine traffic density along with traffic flow rates by lane if the user is traveling on a multi-lane road. The user may be alerted which lane to travel based on the fastest flowing if the vehicle is traveling a multilane road. If the user is using map-based navigation, the traffic density and speed information could be used to re-routed the vehicle navigation to avoid congestion. When the drone user is satisfied with the traffic reconnaissance the drone user may signal the drone 105 to return to the vehicle 110.

Drone delivery system 100 may be configured to facilitate pickup of cargo and provide cargo information. The drone 105 retrieving cargo provides far greater convenience to an occupant of a vehicle compared to the alternative of needing to leave their vehicle navigator route to go to the retrieve the cargo (e.g., fresh brewed coffee) themselves. For example, the route decider program 215a may determine an estimated time to retrieve the cargo from the pickup location, or if there is a choice for the pickup location, determine a time estimate for both potential pickup locations. A time estimate is calculated that indicates the time it will take for the drone to pick-up the cargo (e.g. coffee at a coffee shop) and deliver it to the vehicle 110.

Before the drone 105 departs from home base to pick-up some cargo, the route decider program 215a may calculate the best route to pick-up the cargo from and the best time to leave to pick-up the cargo. If there are choices for pickup location, for example, when a coffee shop chain has more than one store within a geographical distance of position of the drone, then the route decider program 215a would need to decide which store is better to pick-up the cargo at. The route decider program 215a may decide the location to go to and the time to leave based on a number of factors regarding the flight, for example, the speed the drone can travel, the distance to the destination, current location, destination, and weather forecast (e.g., prevailing wind speeds and precipitation). The route decider program 215a may generate an arrival time based on all the number of factors gathered regarding the flight plan.

If the drone is not able to fly a straight line to the pickup location, i.e. there are tall buildings, trees or hills in the way, then a routing algorithm such as those discussed herein may be applied. Various pieces of information may be to take into account including the various pickup locations, physical obstacles (such as buildings or mountains, air traffic control around airports), any restrictions on air travel (e.g. around an airport), the weather (including wind and predicted precipitation), using all logistic data the drone delivery system 100 may calculate flying segments and nodes of various routes that the drone 105 could take. In addition other pieces of data may be gathered, such as information about any queuing of drones at the pickup locations. Finally, the drone delivery system 100 may estimate delivery times based on the available pickup locations flying routes and other information to determine the best pickup location and route to take. Then the flight path for the drone may include flight segments and nodes (e.g., waypoints).

The route decider program 215a may determine or acquire the time it will take to travel a particular route. The route decider program 215a may calculate a time estimate for the whole route or parts of the route, for example based on time estimates to traverse each segments, and time estimate to complete the transition at each node. The time to estimate may be determined based on such factors as the average speed on that segment and the length of the segment. Estimated time needed to traverse the segment and the time needed to complete each segment may be obtained. The route decider program 215a may obtain anticipated speed data from other sources of traffic information (e.g., data from speed probes, cellphone GPS's, traffic cameras, and road sensors). The drone route decider program 215a may take into account the estimated time to pick-up the cargo as well as to determine the intersection of the location for the car and the drone. The routing approaches discussed herein may be used to determine the quickest route through a set of flight segments and nodes.

Figure 5A:
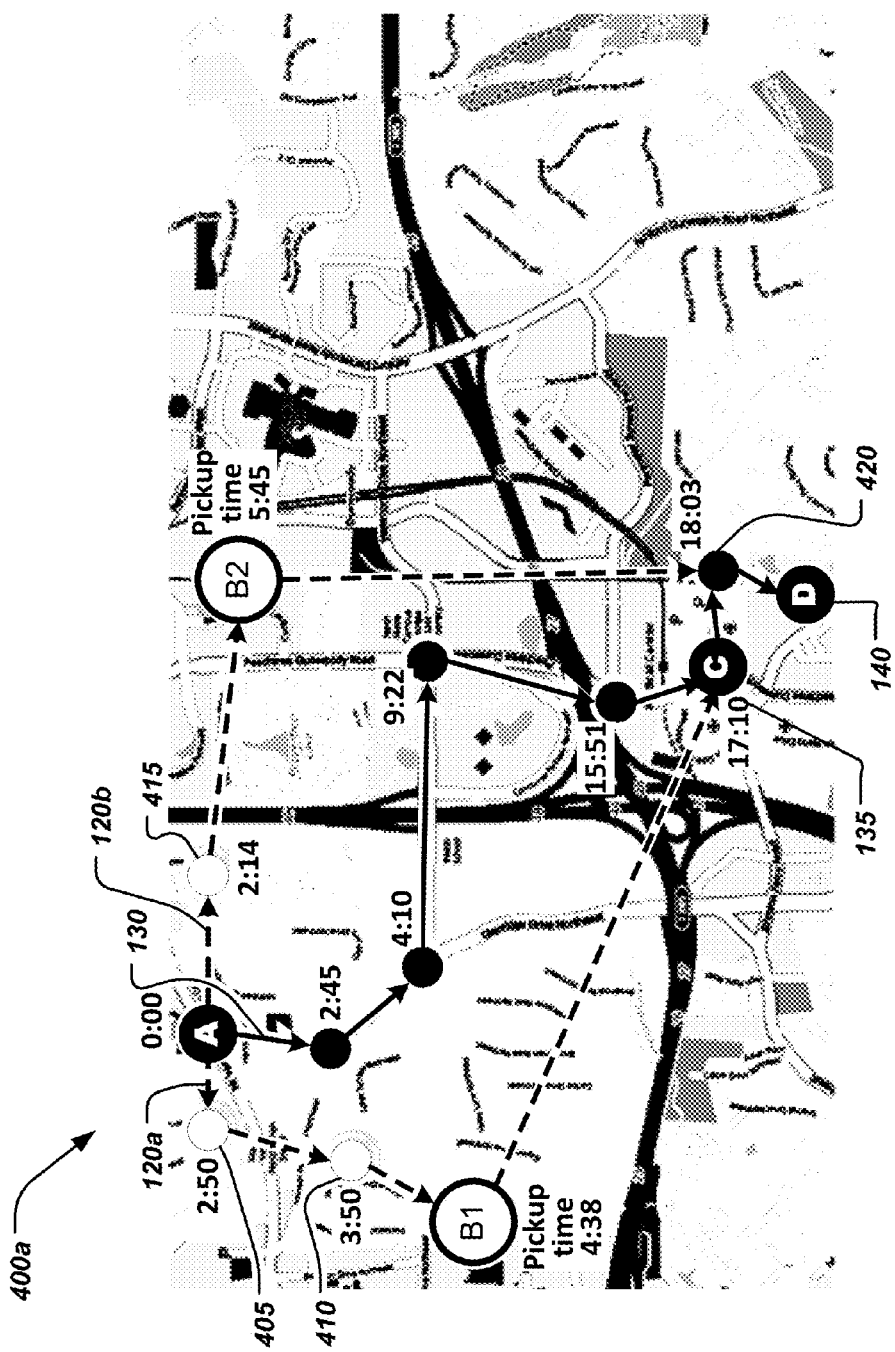
FIG. 5A is a map showing flight plan options for a drone to pick-up cargo.

In one exemplary approach, FIG. 5A includes a map 400a that illustrates an exemplary flight plan option for drone 105 to pick-up cargo (e.g., a cup of coffee). Flight plan options could include picking up an item and delivering it to a vehicle 110. There are a number of decisions that the drone delivery system 100 needs to make to complete this delivery of the cargo. An exemplary approach for the decisions necessary to complete the task is described below in the discussion of FIG. 6. For example, route decider program 215a may be configured to work with the rest of the system to determine the best location from which to retrieve the cargo.

The drone 105 may have a choice as to where it will pick-up its cargo (e.g., fresh brewed coffee) from a cargo location "B1" or "B1" (e.g., coffee shops having multiple locations). A vehicle navigation system may be configured to identify the cargo location (e.g., coffee shop) and a navigation route for vehicle 110.

The drone route decider program 215a may determine if the drone 105 should retrieve coffee from store "B1" or from store "B2." The drone route decider program 215a may be a traditional hand coded program, for example written using heuristics or may be a determined entirely or informed by machine learning techniques.

In the example shown in FIG. 5A, the drone route decider program 215a may evaluate various sources of information to determine a flight plan for the drone. One possible flight plan 120a would stop at location"B1" for the coffee. The drone 105 flying route 120a should reach point 405 at two minutes and fifty seconds. Then the drone 105 would turn south and reach point 410 at about three minutes and fifty seconds. Next, the drone 105 would turn slightly west until it reaches its destination B1 and picks up the coffee at four minutes and thirty eight seconds. The drone would continue flying to intercept the vehicle 110, which the drone route decider program 215a may estimate the drone 105 and the vehicle 110 would rendezvous at point "C" at time 17 minutes and 10 seconds.

A second flight plan option would be to travel route 120b stopping at location "B2" for the coffee. The drone is projected to reach point 405 at two minutes and fourteen seconds. The drone would take a slight turn to the south and reach point B2 to pick-up the coffee at five minutes and forty-five seconds. The drone route decider program 215a could estimate an intercept at point 420 at eighteen minutes and three seconds.

FIG. 5B is a map showing a flight path for the drone to rendezvous with a vehicle to complete the delivery of the cargo (e.g., cup of coffee). The drone rendezvous router program 215b can route the drone 105 to rendezvous with the vehicle 110. The drone rendezvous router program 215b may review the progress of the vehicles 110 along its route 130. It may project that the vehicle 110 will reach point 405 in two minutes and fifty-one seconds and reach point "C" at three minutes and five seconds. The drone rendezvous router program 215b may estimate that the drone flying along path 120a to reach point "C" at three minutes and ten seconds.

Since the drone and vehicle may not arrive at point "C" at the exact same time, the drone rendezvous router program 215b may adjust the rendezvous position and time. As the drone continues to fly and the vehicle 110 continues to move, the drone rendezvous router program 215b may develop a new rendezvous position and adjust the flight path of the drone 105 so that the vehicle and drone may meet up at an updated rendezvous position.

The route decider program 215a may determine that flying to the coffee shop B1 will result in less overall travel time than flying to coffee shop B2.

The route decider program 215a may plot a vehicle navigation route, which may be gathered or generated from any number of sources. For example, gathered data to determine a vehicle navigation rout may include using an on-board vehicle routing system, generated by a vehicle routing algorithm (such as the routing approaches discussed herein), or information gathered from previous trips along the same route. These vehicle routes may be composed of a series of nodes and segments where the nodes may indicate locations where the route may transitions between road segments—for example, a left turn at an intersection or a stop light—and the segments indicate segments of a road that the vehicle plans on traveling.

The route decider program 215a may gather and store typical driving patterns, for example daily driving patterns (e.g. the drive to work, the drive to home, the drive to worship center, the drive from worship center to home). The route decider program 215a may gather and store discrete data such as vehicle speed, location, and number of typical route deviations from common route noted by the day of week.

There are a number of ways the route decider program 215a may be programmed to determine the flight plan. The route decision program 215a may incorporate a traditional ad hoc programming approach could or may use machine learning techniques as described below to establish or improve the routing of the drone.

In another exemplary alternative, heuristics-based calculation may be used by the drone route decider program 215a to estimate the time and determine to which pickup location to travel. For instance, the heuristics-based calculation could count the number of nodes the vehicle 110 is to travel. The ad-hoc calculation could also count the number of segments and distance to be traveled, and then approximate the time to travel based on the average speed.

Similar heuristics-based calculations could be performed for the flight route of the drone. In addition, system 100 (e.g., computing system 103) may be configured to utilize the following:

Machine learning including classes of algorithms that can be programmed into a computing device so the computing device can "learn" from gathered data, i.e. training data, rather than running a program written explicitly by a computer programmer.

Generalization/generalizability is the ability of an algorithm to perform well on examples not seen in training Algorithms that do not generalize well are said to over-fit the data.

Classification algorithms predict discrete output values, for example a tree, a stop sign, a car, a truck etc.

Regression algorithms predict continuous output values, for example, it will take ten (10) minutes and twenty-three (23) seconds to fly the route.

Supervised learning algorithms operate on labeled training examples, labeled meaning that each training example is "labeled" with the answer, such that the answer or output is known for each training example. Deciding the correct answer (i.e., "labeling") is often done by a person.

Unsupervised learning algorithms operate on unlabeled training examples, where the objective is often to discover underlying structure in example data (e.g., by finding ways to look at the data so that the examples can be grouped in distinct clusters).

Pattern recognition encompasses both supervised and unsupervised machine learning algorithms. A simple example of a pattern recognition algorithm is taking inputs and assigning values or set of classes to those inputs (e.g., "this car is speeding," "this car is traveling within the speed limit," "this car is stopped," etc.).

In addition, system 100 (e.g., computing system 103) may be configured to utilize an Artificial Neural Network (ANN). ANN is a machine learning technique that is inspired by biological neurons that modifies the connection strength between neurons to adapt to particular training data. ANNs consist of interconnected nodes, or neurons, often with multiple layers. Like other learning techniques, ANNs can be used to uncover underlying structure to the data, and ANNs can be very effective at uncovering complex and non-linear behavior.

For a drone objective of flying to pick up cargo to deliver to a moving vehicle it is desirable to be able to estimate the amount of time that a drone will take to pick-up and rendezvous with the vehicle 110 based on a number of factors including: pickup location distance, number of turns, estimated delay due to number of obstacles, number of turns in drones route, number of segments, time to traverse each segments, distance that the car is traveling away from route, estimated round trip time to a delivery point, number of drones picking up packages, estimated delay to fulfill the package delivery. Hypothetical training data is shown in table 1.

TABLE 1

Hypothetical Training Data:

| | | Training Data | | |
| --- | --- | --- | --- | --- |
| Input | Variable | Delivery location 1 | Delivery Location 2 | Delivery location 3 |
| Pickup location distance | $x_1$ | 5.1 miles | 6.3 miles | 4.1 miles |
| Average distance car makes in route | $x_2$ | 4.0 miles | 3.0 miles | 4.0 miles |
| Delay due to number of obstacles for drone | $x_3$ | 1.1 minutes | 0.1 minutes | 2.1 minutes |
| Number of turns in drones route | $x_4$ | 3 | 7 | 5 |
| Number of segments traversed | $x_5$ | 4 | 8 | 6 |
| Average time to traverse each segment | $x_6$ | 2.1 minutes | 1.1 minutes | 1.8 minutes |

TABLE 1-continued

Hypothetical Training Data:

| Input | Variable | Training Data | | |
| --- | --- | --- | --- | --- |
| | | Delivery location 1 | Delivery Location 2 | Delivery location 3 |
| Approximate distance car is traveling away from pickup point | $x_7$ | 2.2 miles | 3.5 miles | 1.1 miles |
| Number of drones picking up packages | $x_8$ | 2 | 0 | 1 |
| Delay to fulfill the package delivery | $x_9$ | 4.5 minutes | 2.1 minutes | 3.6 minutes |
| Time to delivery | y | 9.7 minutes | 11.3 minutes | 7.1 minutes |

Figure 7:
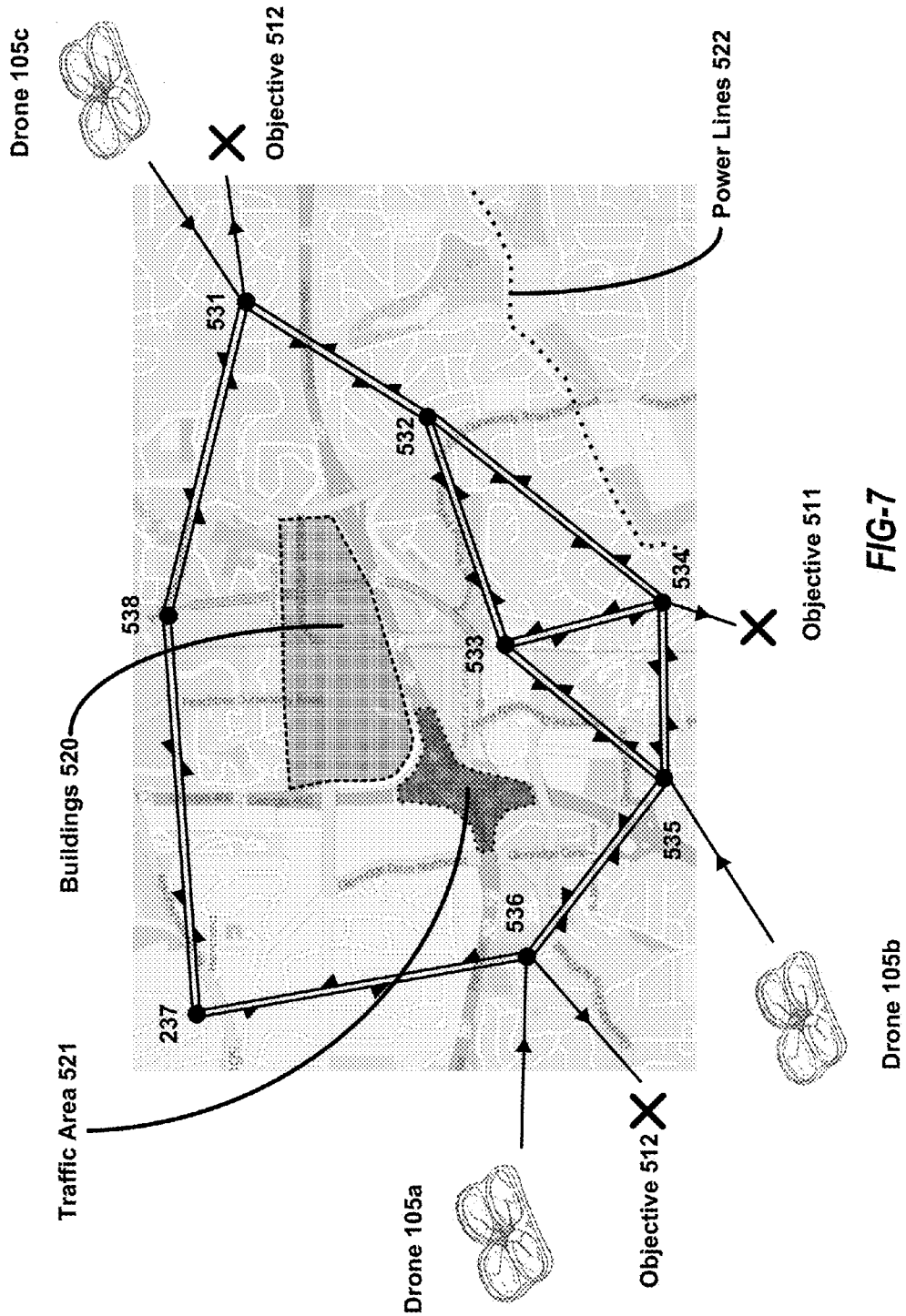
FIG. 7 is a map showing the flight paths for a plurality of drones.

Input data may be normalized, often by subtracting the mean and dividing by the standard deviation of all input training values for a specific input variable. For example a set of distance inputs, $D_i$, can be normalized $D_{norm,i}$ as:

$$D_{norm,i} = \frac{D_i - \mu}{\sigma} \quad \text{Equation 1}$$

Where $\mu$ is the mean of all distances and $\sigma$ is the standard deviation of all distances. Normalized input values may then be stored in a vector $X=\{x_1, x_2, x_3, x_4, x_5, x_6, x_7, x_8, x_9\}$, for example where $x_1$ is $D_{norm,i}$. X may be used as the inputs to a neural network, for example the simplified neural network shown in FIG. 7. Note FIG. 7 is for illustrative purposes and shows 3 inputs, where the above table provides 9 inputs.

ANNs present one technique to estimate the require trip time in drone routing from previous examples of routed drones. Learning techniques such as ANNs may be advantageous as estimates of drone travel time may be improved as more data is collected as more drones are routed, in this way drone routing procedures such as those discussed here can be made more accurate over time. Artificial neural networks are used as an informative example here, but other learning algorithms may be useful such as multivariate linear regression, support vector machines, Gaussian process modeling, or decision trees.

Figure 6:
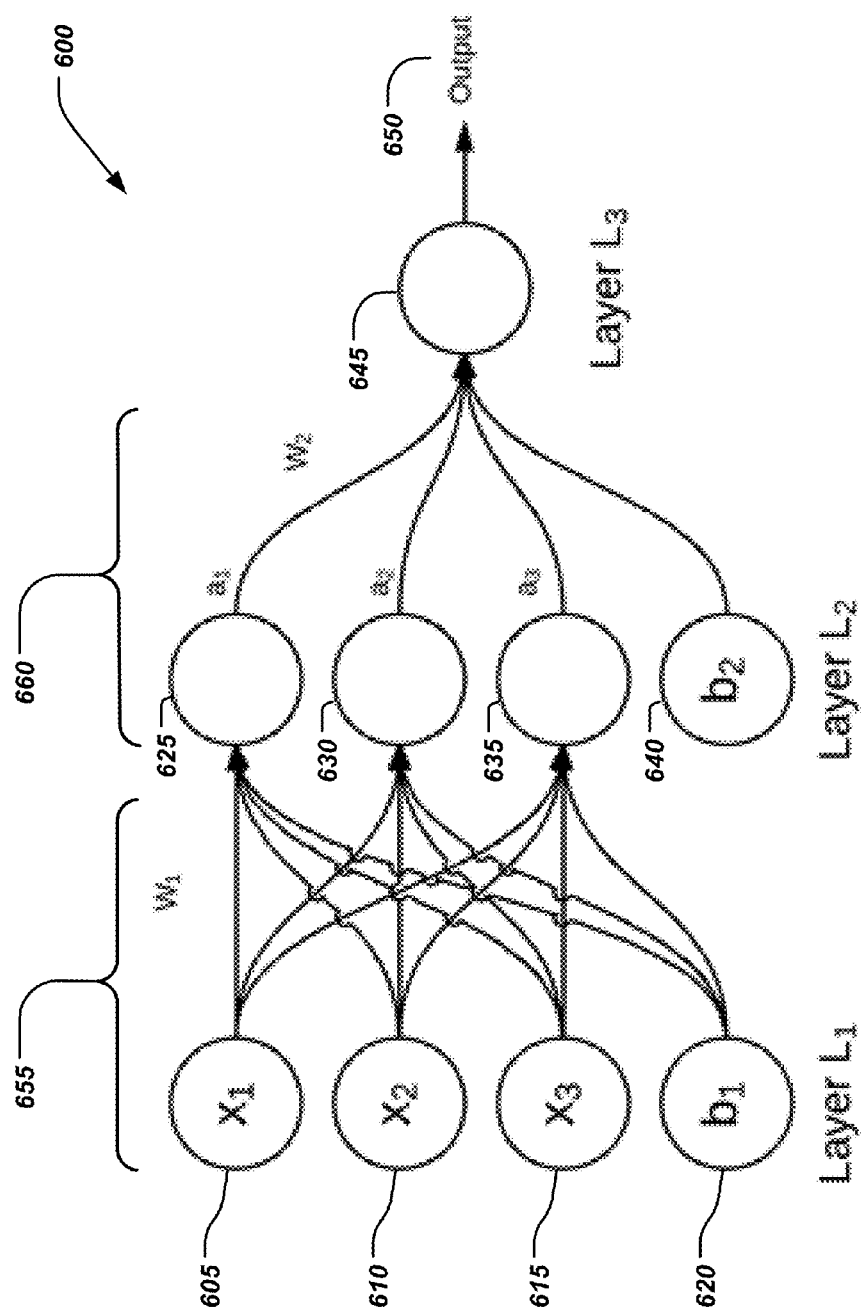
FIG. 6 illustrates a simplified neural network.

FIG. 6 depicts a neural network 600 having an input layer $L_1$, ($x_1$, $x_2$, $x_3$, and bias $b_1$, 605, 610, 615, and 620 respectively) hidden layer $L_2$ (circle 625 that produces neuron output $a_1$, circle 630 that produces neuron output $a_2$, 635 that produces neuron output $a_3$, and input bias $b_2$ 640), and output layer $L_3$ 645 that produces output 650. The training data provides values for layers $L_1$ and $L_3$. The structure of neural network 600 is an informative example; an actual implementation may consist of more hidden layers, and more inputs. Each neuron in layers $L_2$ and $L_3$ sums all inputs to the neuron and applies the result to this input of its activation function. For example, the activation function may be a sigmoid function, resulting in an output from a given neuron as shown in equation 2 below.

$$\text{neuron output} = \frac{1}{1 + \exp(-W_i^j X^T + b_i)} \quad \text{Equation 2}$$

W is a matrix that holds the weighting factors to apply to each input value of a neuron to determine the output of the neuron. The matrix of weighting factors W start out unknown and are determined or learned based on the training data. Neural network 600 includes two weighting matrices $W_1$(3×3) and $W_2$(1×3), plus two bias values $b_1$ and $b_2$, which may also be learned in the training process. $W_j^{i,k}$ are the weighting factors where j is the layer (depicted as a columns 655 and 660) and i is the output row (for example $a_1$, $a_2$, $a_3$, for layer $L_1$ 655 and output 650 for layer $L_2$ 660), and k is the input row (for example $x_1$, $x_2$, $x_3$ for layer $L_1$ 655). In this way, inputs ($x_1$, $x_2$, $x_3$, and bias $b_1$) may be propagated forward through the network to predict a single output 650. $X^T$ is the transpose of X. X is the normalized input vector taken from the numerical values shown in table 1 that are the inputs to the neural network Once a practitioner establishes the structure of a neural network, a number of techniques exist for training the neural network (that is, determining $W_1$, $W_2$, $b_1$ and $b_2$), often relying on the back-propagation of errors through the network. This technique relies on minimizing a cost function, and may rely on a number of techniques from the field of optimization. For example, the neural network 600 may make use of a cost function such as equation 3 for a single training example.

$$C(W, b; X, y) = \frac{1}{2}\|\text{output} - y\|^2 \quad \text{Equation 3}$$

Where C(W,b; X,y) represents the cost of a specific set of weights (W,b) for a single training example (X,y), cost may be understood as proportional to the difference between the correct output, y, and the modeled output, output. The overall cost sought to minimize for a set of training examples, for example the training data shown in table 1, is shown in equation 4 below.

$$C(W, b) = \left[\frac{1}{m}\sum_{i=1}^{m}\left(\frac{1}{2}\|\text{output}_i - y_i\|^2\right)\right] + \frac{\lambda}{2}\sum_{j=1}^{2}\sum_{i=1}^{N}\sum_{k=1}^{M}\left(W_j^{i,k}\right)^2 \quad \text{Equation 4}$$

Where there are m training examples (from table 3 m=3), and each weight matrix, $W_j$, consist of N rows of outputs and M number of layer inputs (from table 3 N=9 for layer $L_1$ and N=1 for layer $L_2$, and M=9), and $W_j^{i,k}$ represents a single entry in matrix $W_j$. The first term in equation 4 is the sum of square errors, and the second term, often referred to as a regularization term, helps avoid overfitting. The parameter $\lambda$ may be tuned during the overall process and represents a trade-off between minimizing error and preventing overfitting. Finally, neural network 600 may be trained by minimizing the cost function, C. This may be accomplished by a number of optimization techniques, for example, stochastic or batch gradient descent to name two.

The training examples may include inputs such as those in the table 1 training example or additional inputs for example weather (including wind, rain temperature), obstacles such buildings etc. In addition to the inputs, the training examples may also have predicted time to complete the routes that corresponds to the set of input parameters.

Timing for the training examples may be obtained from simulations of the routes or recorded times for drones along the routes. Route decider program 215a may be configured to analyze inputs including distance to the pickup location, number of turns, obstacles, distance that the car is traveling away or toward a possible pickup point, and the number of other drones traveling to the location at the same time, etc. For example, the drone route decision program 215a may predict the time it would take to deliver cargo based on tested input parameters used as inputs to the machine learning algorithm, discussed above. Furthermore, route decider program 215a may utilize vehicle location information to identify the nearest place that drone 105 could pick-up cargo or determine a direction of travel of vehicle 110. Route decider program 215a may also be configured to receive a human input, for example, what a user believes to be the best route. In addition, route decider program 215a may take into account a number of drones picking up or scheduled to pick-up items to determine which coffee shop has less drone traffic.

The route decider program 215a system may confirm that a cargo location (e.g., the coffee shop) is within range of drone 105 by comparing a drone range of drone 105, a distance to the cargo location, and a return distance from the cargo location back to the vehicle. The drone delivery system 100 may communicate with the cargo location, for example, an order for the coffee to the coffee shop. Once drone 105 is near the cargo location, the drone 105 finds a guide, e.g. a laser guide to a fly-thru window. A machine or an employee at the cargo location may place the cargo on the drone. Once the drone has the cargo, the drone may rendezvous with the vehicle 110.

FIG. 7 is a map conceptually illustrating an example simultaneous routing method for multiple drones. The drones 105 may include drones 105a, 105b, and 105c, and three corresponding objectives 511, 512, and 513, where drone 105a is routed to objective 211. While any number of potential drone paths exist in a three-dimensional space between two or more locations, a node system, e.g., including nodes 531-537, may be utilized. This may provide benefits including avoidance of obstacles, more flexible routing in the event of new information, simplified routing computational complexity, and a simplified method for multiple organizations to share airspace. Nodes and paths between nodes may be determined by optimization methods such as those discussed above, by experts, or by a hybrid approach wherein experts validate and improve algorithm-generate node placements. Although FIG. 7 shows linear paths between nodes, paths may be nonlinear. Paths may also be non-constant altitude. Nodes 531-537 may also represent multiple altitude drone sub-positions, allowing higher throughputs.

As illustrated in FIG. 7, not all paths between all nodes (or vertices) are allowed by computing system 103. For example, the path from node 236 to 238 would pass over a high traffic area and a tall building area, and it may be useful to remove this path from the list of available paths. In general a matrix of cost values wherein a cost for each path (or arc) may be determined. Let nodes 531-537 be referred to as vertices 1-7, respectively. A cost matrix C for the routing problem in shown in FIG. 7 may be expressed as:

$$C^j = \begin{bmatrix} C_{1,1} & \cdots & C_{1,8} \\ \vdots & \ddots & \vdots \\ C_{8,1} & \cdots & C_{8,8} \end{bmatrix}.$$

Equation 5 where $C^j \in \{C^1, \ldots, C^J\}$, where J is the total number of drones being routed. $C_{18}$ is the cost associated with traveling from vertex 1 to vertex 8, $C_{81}$ is the cost associated with traveling from vertex 8 to vertex 1, and so on. Many of the entries in matrix C may be unnecessary or arbitrary, such as recurrent arcs such as $C_{11}$, or arcs that are impassible such as $C_{68}$. Depending of the applied mathematical strategy it may be useful to set recurrent arcs to a cost of 0, and impassable to arcs to a cost of infinity. Finally, matrix C may be considered a sparse matrix, depending on the level of connectivity of the vertices.

In some cases the routing problems discussed here may fall under what is generally referred to as the Vehicle Routing Problem (VRP), where a number of customers are serviced by multiple vehicles. Solutions of varying complexity have been developed to address numerous subsets of this problem, such as the Capacitated Vehicle Routing Problem (CVRP), where vehicles have limited capacity. Heuristic and deterministic solutions to various VRPs have been developed, including software such as jsprint, Open-VRP, OptaPlanner, vrphlibrary, and vroom.

In the example embodiment shown here, existing VRP solutions may be useful in determining drone routes ahead of time, given the placement of vertices 531-538 and relevant costs. Costs C may be as simple as the distance between vertices or the time required to travel between two vertices. Is these applications, established routing algorithms such as Dijkstra's algorithm, the Bellman-Ford algorithm, the A* algorithm, Euclidean shortest path, or Johnson's algorithm may be useful. These algorithms do not typically take into account the potential conflicts when routing multiple vehicles.

Alternatively, cost may be determined from more diverse inputs, such as the proximity of routes to potential dangerous areas, the distance between drones, or the relative importance of a drone's mission. For example, $C_{12}$ may be computed as $$C_{1,8}{}^j = w_d d_- + w_p p_{18},$$

Equation 6 where $d_{18}$ is the distance between vertices 1 and 8, $p_{18}$ is the proximity of the drone to potentially dangerous obstacles on the path between vertices 1 and 8, $w_p$ is the weight assigned to distance, and $w_i$ is the weight assigned to the proximity to potentially dangerous obstacles. Weight values w may be set to constant values throughout a problem to assign the relative importance of factors, in this examples distance and proximity to obstacles importance.

Effective routing may generally achieved by minimizing the sum of cost functions for all drones in set J:

$$\operatorname{argmin} \sum_{j=1}^{J} \left[ w_j \cdot \sum_{a,b \in P} C_{a,b}^j \right]$$

Equation 7 where a and b are the indices of the vertices that drone j will transverse on its path, and $w_j$ is the relative importance factor assigned to each drone mission (larger values indicate higher importance). For example, if drone j travels from vertex 1 to vertex 2 to vertex 4, then $$\sum_{a,b \in P} C_{a,b}^j = C_{1,2}^j + C_{2,4}^j \qquad \text{Equation 8}$$

A parameter such as relative mission importance in the overall cost function will effectively allow drones with more important missions to take shorter routes than those with lower priority missions.

In many drone or autonomous vehicle routing problems, information may evolve over time (e.g., as drones are in route). Further, it may be advantageous to consider stochastic (e.g., rather than solely deterministic inputs) when routing drones. For example, if drones or autonomous vehicles are used in emergency applications, it may be useful to consider where emergencies have historically occurred and based on this historical evidence, determine the relative probabilities of emergencies occurring in specific locations. Drones may then be stationed close to or instructed to spend more time close to areas with higher probabilities of emergency occurrence. By adapting routes to probabilities of future events, drones are routed based on stochastic input rather than deterministic (for example, a specific emergency call).

Dynamic routing problems (e.g., information evolves over time) may be approached in various ways. One approach is to periodically optimize routing throughout the day, or re-optimize when new information is received. A tradeoff exists here between the time required to compute optimal routing and the lost time where in drones are not traveling or traveling on a non-optimized route. Several strategies may be adopted to mitigate the loss of travelling time due to computation. Parallel computation hardware and algorithms may be used to increase computational speed, especially when the costs of many potential routes may be computed independently. Computational down time, when drones are in route and no new information is being delivered may be used to compute similar route combinations to the one being run to reduce the computation needed when new information is obtained. Finally intermediate solutions may be produced that are fine-tuned once drones are in route. Such routing problems can be solved by numerous techniques including linear programming (LP), adaptive search techniques, greedy approximations (where, for example, drones are routed one at time, starting with the most important objectives), or other heuristic based or deterministic algorithms.

Hypothetical data relevant to the problem shown in FIG. 6 may include a transversal time and a proximity to dangerous areas as shown in table 2 below.

TABLE 2

Hypothetical Information for Each Arc

| Arc (directionally symmetric) | Travel Time (s) | Proximity to obstacles (0-1) | Capacity (number of simultaneous drones) |
|---|---|---|---|
| 1, 2 | 31 | 0.1 | 1 |
| 2, 3 | 25 | 0.2 | 1 |
| 2, 4 | 27 | 0.4 | 1 |
| 3, 4 | 24 | 0.2 | 1 |
| 3, 5 | 25 | 0.2 | 1 |
| 4, 5 | 28 | 0.3 | 1 |
| 5, 6 | 29 | 0.3 | 1 |
| 6, 7 | 37 | 0.2 | 2 |
| 7, 8 | 43 | 0.2 | 2 |
| 8, 9 | 39 | 0.2 | 1 |

The cost of traversing each route may then be computed using equation 2. If $w_d$ is set to 1 and $w_p$ is set to 10 (effectively making proximity able to increase the cost by what would be equivalent to a 10 second penalty for flying close to obstacles), the hypothetical costs for each arc would be computed as shown in table 3 below.

TABLE 3

Hypothetical cost for Each Arc

| Arc (directionally symmetric) | Cost |
|---|---|
| 1, 2 | 32 |
| 2, 3 | 27 |
| 2, 4 | 31 |
| 3, 4 | 26 |
| 3, 5 | 27 |
| 4, 5 | 31 |
| 5, 6 | 32 |
| 6, 7 | 39 |
| 7, 8 | 45 |
| 8, 9 | 41 |

Other relevant information to this routing problem may include the relative importance of each objective. Table 4 below shows example priority for each objective. In practice, priority levels could be replaced with the profit or revenue from each objective.

TABLE 4

Relative Objective Priorities

| Objective | Priority |
|---|---|
| 511 | 3 |
| 512 | 3 |
| 513 | 2 |

Routing for a single may be accomplished by a number of algorithms such as Dijkstra's algorithm, the Bellman-Ford algorithm, the A* algorithm, Euclidean shortest path, or Johnson's algorithm. As algorithms such as these are typically not used to route multiple drones simultaneously, priority may be used to determine the order of routing, with highest priority drones routed first. Arc overlap and capacity must be taken into account here to ensure that the capacity of an arc is not exceeded. This may be accomplished by adjusting the cost function of specific arcs after each drone is routed, to include extra waiting time for previously routed drones to clear an arc.

The example presented above is intended to be purely illustrative, and more complex algorithms that attempt to simultaneously route all drones (such as linear programming and adaptive search methods) may yield superior results.

Depending on the marketplace, a variety of inputs may be useful in computing cost functions for routing. For example, if drones are being used to deliver consumer goods, it may be advantageous to reduce the time between a customer order and delivery. However, if drones are used to pick-up goods from customers, it may only be important that a drone arrive within a specific time window. Based on the large potential range of relevant costs when routing drones, it may be beneficial for a drone fleet operator to establish a routing marketplace, wherein drones may be routed to maximize the profit or revenue earned by operating the drones. If the fleet operator is selling delivery and/or other services, the fleet operator may take bids on various objectives (for example, delivering a specific number of goods within specific time windows). The fleet operator may then optimize routing solely or partially based on profits or revenue from operations, and may accept only those bids that allow her to do so.

Optimal drone routing may then consist of maximizing overall profit. The profit for a single objective may be computed as $$P_{objective,route} = R_{objective} - C_{route},\quad \text{Equation 9}$$

Where $P_{objective,route}$ is the profit from completing a specific objective via a specific route, $R_{objective}$ is the revenue earned from completing the objective, and $C_{route}$ is the cost of completing the route. $C_{route}$ may include fuel costs, maintenance costs, or other relevant costs. Profit is then maximized by:

$$\operatorname{argmax} \sum_{o=1}^{O} P_{o,route} \quad \text{Equation 10}$$

This is subject to routing constraints, where O is the number of objectives achieved. A valid set of objectives must not violate specific arc constraints (number of drones that can simultaneously travel between vertices). As routing multiple drones simultaneously may result in significant computational complexity, heuristics-based routing approaches may be useful.

The drone rendezvous program 215b may be configured to coordinate a rendezvous with the vehicle 110. When the drone above the vehicle the drone 105 may signal the vehicle docking system and the trunk may open. The drone docking system may send out a short-range wireless signal from multiple transmitters in the vehicle, the drone may use the short-range wireless signals to triangulate the location of the landing to guide the drone to the vehicle docking station. The vehicle may stop to retrieve the coffee from the drone. The vehicle 110 may have a guide, e.g. a laser guide, guides the drone it to the roof where it lands so the cargo (i.e. coffee) may be retrieved. Laser-based guidance may be provided for the drone to follow into the landing or drone docking station. The laser may provide a straight line path to the vehicle when the vehicle 110 and the drone 105 are in sight of each other. For example, a LIDAR system may be configured to recognize a three-dimensional makeup of a trunk of vehicle 110 or a receptacle for drone 105.

The drone rendezvous router 215b may constantly re-calculate the rendezvous location as both the drone 105 and the vehicle 110 travel towards the rendezvous location taking into account the updated vehicle 110 location, time projected speed etc. The travel direction of the drone 105 may be constantly adjusted based on an updated rendezvous location. The drone rendezvous router 215b may optimize the drone routes to a particular pickup location with unsupervised machine learning. Once the vehicle 110 is close to the rendezvous location and is in short-range communication distance, the drone 105 and vehicle 110 may communicate with short-range wireless technology to better determine location of the vehicle 110 relative to the drone 105.

The drone rendezvous program 215b may reside on the drone with updated information in regards to the location of the vehicle 110 being received either through the network 114 or by direct communication between the vehicle 110 and the drone 105. Alternatively, the drone rendezvous router program 215b may reside on the vehicle 110 and receive information via the cell phone tower network 114 in regards to the location of the drone 105. Corrections to the direction that the drone 105 should be flying can be communicated through the communications network 114. In a third illustrative alternative, the drone rendezvous router program 215b could reside on a third location, for example somewhere in the cell phone tower network 114. Drone rendezvous program 215b may be executed by any device or system configured to communicate with any or all of drone 105, vehicle 110, and network 114, as described above.

The drone then sends and receives the projected rendezvous location at the time the drone will rendezvous. The vehicle's projected location is based on current speed and destination along with the distance and required flying time. The vehicle could be stopped when the vehicle launches and returns to allow the trunk to open and for the drone to successfully enter the vehicle 110 and set down in the proper position.

Over time drones delivering items may become more prevalent, and in that future it may be important to have the equivalent to an airplane air traffic controller, e.g., a drone air space control. The drone air space control could use all the information gathered from the drones and their planed flight plan to take into account when determining the drone's flight paths.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 8:
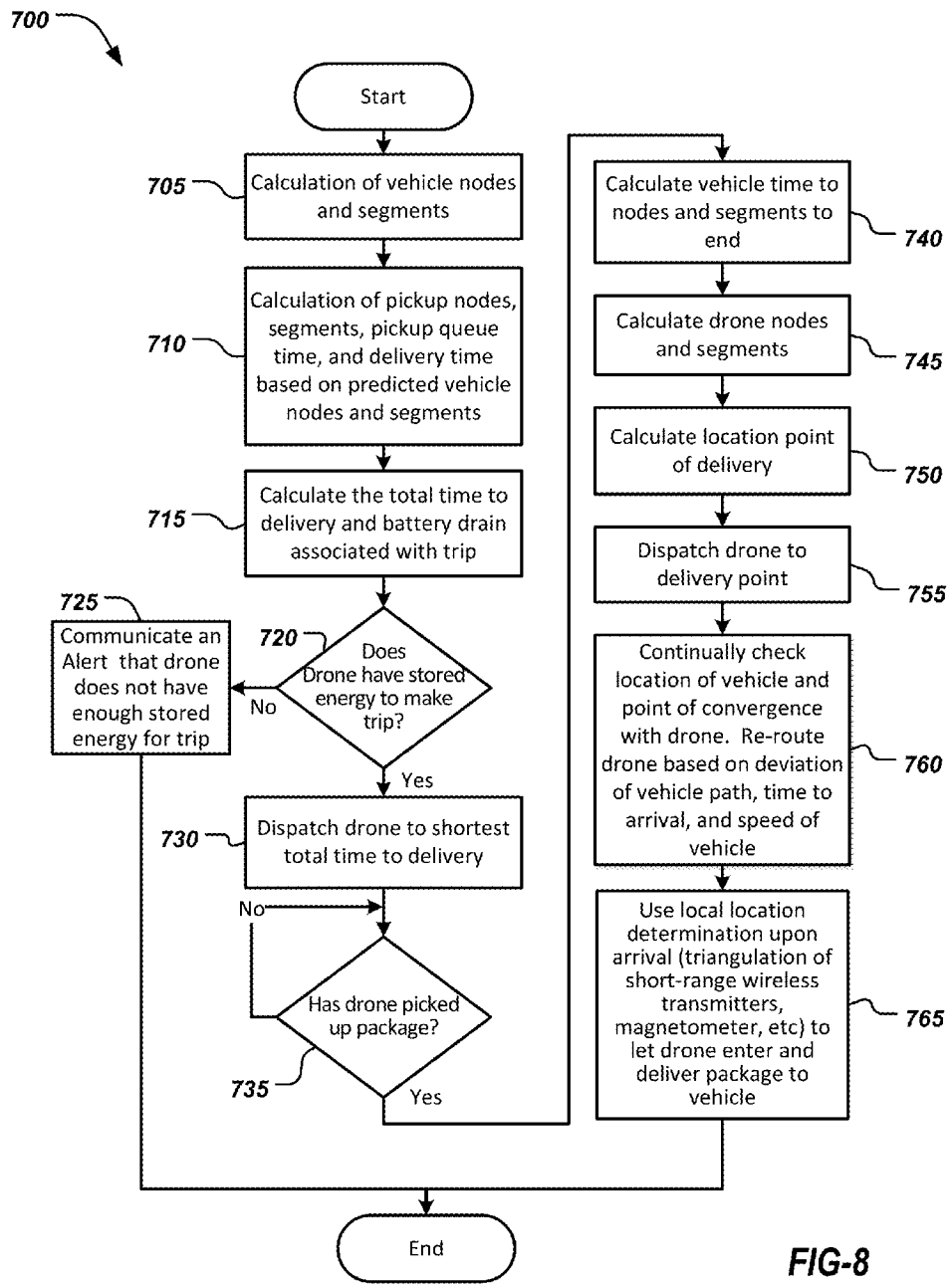
FIG. 8 the flowchart of an exemplary process for generating a flight plan for a drone.

FIG. 8 is a flowchart of an exemplary process 700 that the computing system 103 may use in deciding a flight plan for a drone 105. For example, drone 105 may start attached to the vehicle 110 and be given a task to fly and retrieve cargo (e.g., coffee) and then rendezvous back with the vehicle 110 to deliver the cargo.

At block 705, the drone delivery system 100 determines a navigation route for the vehicle 110 and breaks the navigation route down into segments of travel between nodes.

At block 710, the drone delivery system 100 determines flying options for a drone 105 as discussed above including such things as pickup nodes, segments, pickup queue time and delivery time based on predicted vehicle nodes and segment by way, for example, of route decision program 215a.

At block 715, the drone delivery system 100 may calculate a total amount of time and energy needed to complete the planned route.

At decision diamond 720, the drone delivery system 100 may determine if the drone 105 has enough stored energy to make the trip. If the drone 105 has enough energy to make the trip then the drone delivery system 100 may proceed to block 730. If the drone delivery system 100 fails to have enough energy to complete the trip then the process 700 continues at block 725.

At block 725, the drone delivery system 100 may inform the requester that the drone 105 does not have enough energy to make the trip to retrieve the coffee.

At block 730, the drone delivery system 100 may dispatch the drone 105 to fly the route to a pickup location that provides the earliest delivery time of the coffee. Alternatively the drone 105 delivery system may choose the route that used the least amount of energy because there was a lack of stored energy to make the trip. It may be that the drone continues attached to the vehicle 110 until it is time to take flight to retrieve the cargo.

At decision diamond 735, the drone delivery system 100 may check to see if the drone 105 has picked up the cargo (e.g. coffee). If the drone 105 has picked up the coffee then the process 700 may continue at block 740. If the drone 105 has not yet picked up the cargo (e.g. fresh brewed coffee) then the process can return to decision diamond 735 two continuously or periodically check to see if the drone 105 has picked up the package.

At block 740, the drone delivery system knows that the drone 105 has picked up the package and calculates the vehicle drive segments and nodes to rendezvous with the vehicle 110.

At block 745, the drone delivery system 100 determines the segments and nodes that the drone 105 may travel.

At block 750, the drone delivery system 100 may determine a rendezvous point with the vehicle 110.

At block 755, the drone 105 begins flying the route that will lead the drone 105 rendezvous with the vehicle 110.

At block 760, the drone delivery system 100, for example using the drone rendezvous program 215*b* continually checks the location of the vehicle 110 and the drone 105 rerouting the drone 105 is necessary based on deviations in the vehicle path and drive time to arrive at a new rendezvous point. The location of the vehicle may be provided in one exemplary approach by the vehicle reporting its satellite location to the drone delivery system 100.

At block 765 the drone 105 is within close range of the vehicle 110, for example within visual line of sight range or short range communication distance. Then the drone 105 approaches the vehicle 110 to deliver the coffee, perhaps by docking to a docking station on the vehicle 110.

The drone delivery system 100 can have a vehicle 110 and a drone 105 along with a computing system 103 comprising one or more components that are configured to determine a flight plan for the drone 105. The flight plan for the drone can be for a number of objectives. The flight plan may include flying ahead to see and deliver traffic information to the vehicle 110. The flight plan may include flying to pick-up cargo, for example food or drink at a restaurant and delivering it to the vehicle 110.

Although the delivery is described as being to a vehicle 110 the delivery could just as easily be to any device that can communicate to the cellular communication network for which a location can be determined using the methods as discussed above. The drone delivery system 100 may be able to deliver any cargo to the holder of a cell phone. Although the drone and the path the drone takes have been described as a flight path, in addition the drone could travel by other means for example on a ground or overwater.

Embodiments may be applicable to any number of uses. Emergency vehicles applications may include, for example: firetruck drones that fly ahead and collect data on fire, wildfire drones configured to collect data from dangerous areas, police and SWAT drones that fly ahead for observation, or investigating potentially dangerous areas, ambulance drones that clear intersections ahead of the ambulance, and help find ideal route to victim or to hospital, and medical drones that deliver crucial medicine or medical supplies to ambulances or medical helicopters in route. Other applications include delivery service drones that fly from truck to drop off or pick up packages at residences or businesses, drones that replenish trucks with more goods to deliver, allowing truck to avoid returning to the delivery center, military reconnaissance drones fly to and from military vehicles, inspection drones may inspect an area for civilians before strike from tank/military vehicle, mobile delivery drones may deliver goods to drivers in route, repair drones that provide parts and service to drivers, and fuel or recharge drones may be configured for in-trip refueling.

The system may be configured to aggregate relevant routing information from various static and dynamic data sources referred herein as external routing additive sources of information. The external routing additive sources of information can be used to determine a drone route to minimize a predetermined cost function. Static data sources may include the location of buildings, power lines, and other physical obstacles, historical traffic and weather patterns, historical information relevant to drone missions (e.g., previous customer orders and buying habits). Dynamic data sources may include real-time traffic maps, real-time weather information, a location of relevant vehicles, a location of the drone, traffic conditions, drone mission, fuel costs, and sensor data captured by the drone. The predetermined cost function is proportional to estimates of relevant quantities such as the time required to complete a mission, the fuel or other costs of the mission, mean or overall distance to obstacles of a given path, and inversely proportional to estimates of quantities such as mission priority.

As described herein the drones may be routed between predetermined nodes along paths (arcs), and specialized routing algorithms, such as Dijkstra's algorithm, the Bellman-Ford algorithm, the A* algorithm, Euclidean shortest path, or Johnson's algorithm are used to optimize routes Existing routing algorithms may be used in conjunction with relevant predetermined costs functions. The predetermined cost function is minimized by optimization methods such as batch or stochastic gradient descent, genetic algorithms, simulated annealing, adaptive search algorithms, brute force, or heuristic-based approaches.

In addition, the system may be configured to route one or more drones to or from one or more vehicles by aggregating relevant static and dynamic data sources and minimizing a predetermined overall cost function. The mission each drone is assigned a relative priority score. The relevant priority score is dependent upon the expected profit or revenue of the mission to the drone operator. A high priority score is assigned to emergency missions. The mean distance between drones is proportional to the predetermined cost function. This may also be applied with respect to overall routing by computing system 103.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
   a server configured to:
      communicate, by way of a network, vehicle information with a vehicle transceiver of a vehicle moving along a vehicle route, wherein the vehicle information at least includes a vehicle location, and
      communicate, by way of the network, drone information with a drone transceiver of a drone moving along a drone route, the drone transceiver including a coarse-grain transceiver for communication with the network and a fine-grain transceiver for communication with the vehicle transceiver, wherein the drone information at least includes a drone location, wherein the coarse-grain transceiver of the drone transceiver is configured for cellular communication with the network to rendezvous with the vehicle and the fine-grain transceiver of the drone transceiver is configured for direct wireless communication with the vehicle transceiver to engage a docking station; and
   a computing device with a memory and a processor configured to:
      communicatively connect with the server,
      process the vehicle information and the drone information,
      identify a plurality of pickup locations based in part on the vehicle information and drone information,
      select at least one of the plurality of pickup locations based in part on a priority score associated with a travel time to or wait time for each of the plurality of pickup locations, and
      update the drone route based in part on the selected pickup location and the vehicle location relative to the drone location.

2. The system of claim 1, wherein the processor is further configured to:
   generate at least one of an updated vehicle route and an updated drone route based at least in part on at least one of the vehicle information and the drone information, and
   communicate the updated route between the vehicle and the drone.

3. The system of claim 1, wherein the processor is further configured to:
   receive, using the network, cargo information including a cargo location associated with a cargo to be retrieved by the drone and delivered to the vehicle,
   generate an additional updated drone route based at least in part on the cargo information, and
   communicate the additional updated drone route to the drone and the vehicle.

4. The system of claim 1, wherein the network is further configured to communicate traffic information to at least one of the vehicle transceiver and drone transceiver, wherein the traffic information indicates traffic congestion along the vehicle route.

5. The system of claim 4, where the processor is further configured to:
   update at least one of the vehicle route and drone route based at least in part on traffic information, and
   communicate the updated at least one of the vehicle route and drone route to at least the vehicle.

6. The system of 1, wherein the coarse-grain transceiver of the drone transceiver is configured to receive the vehicle location from the network and the fine-grain transceiver of the drone transceiver is configured to receive a fine vehicle location from the vehicle transceiver, and wherein the processor is configured to compare the vehicle location from the network and the fine vehicle location from the vehicle transceiver.

7. The system of claim 1, wherein the coarse-grain transceiver of the drone transceiver is configured to position the drone relative to the drone route and the fine-grain transceiver is configured to position the drone relative to the vehicle.

8. The system of claim 1, wherein the coarse-grain transceiver of the drone transceiver is configured to position the drone relative to the docking station as part of the vehicle.

9. A drone comprising:
   a drone transceiver including a coarse-grain transceiver for communication with a network and a fine-grain transceiver for communication with a vehicle transceiver, wherein the coarse-grain transceiver is configured to:
      communicatively connect with at least a network,
      transmit drone information to the network while the drone moving along a drone route to a destination point, wherein the drone information at least includes a drone location, and receive vehicle information from the network while a vehicle is moving along a vehicle route, wherein the vehicle information at least includes a vehicle location, wherein the coarse-grain transceiver of the drone transceiver is configured for cellular communication with the network to rendezvous with the vehicle and the fine-grain transceiver of the drone transceiver is configured for direct wireless communication with a vehicle transceiver of the vehicle to engage a docking station; and a computing device operatively connected to the drone transceiver, the computing device including a memory and a processor configured to:

update the drone route based at least in part on the destination point and the vehicle location relative to the drone location, and communicate the updated drone route to the network.

10. The drone of claim 9, wherein the processor is further configured to:

receive traffic information using the network, wherein the traffic information indicates traffic congestion along the vehicle route, update the drone route based at least in part on traffic information, and communicate the updated drone route to at least the network.

11. The drone of claim 9, wherein the drone transceiver is further configured to communicatively connect directly with a vehicle transceiver of the vehicle.

12. The drone of claim 9, wherein the fine-grain transceiver of the drone transceiver is configured to receive the vehicle location from the network and the coarse-grain transceiver of the drone transceiver is configured to receive the vehicle location from the vehicle transceiver.

13. The drone of claim 9, wherein the coarse-grain transceiver of the drone transceiver is configured to position the drone relative to the drone route and the fine-grain transceiver is configured to position the drone relative to the vehicle.

14. The drone of claim 9, wherein the fine-grain transceiver of the drone transceiver is configured to position the drone relative to the docking station as part of the vehicle.

15. A method comprising:

receiving, with a network, vehicle information from a vehicle transceiver of a vehicle moving along a vehicle route with respect to a destination point, wherein the vehicle information at least includes a vehicle location, and receiving, with the network, drone information with a drone transceiver of a drone moving along a drone route, the drone transceiver including a coarse-grain transceiver for communication with the network and a fine-grain transceiver for communication with the vehicle transceiver, wherein the drone information at least includes a drone location, and wherein the coarse-grain transceiver of the drone transceiver is configured for cellular communication with the network to rendezvous with the vehicle and the fine-grain transceiver of the drone transceiver is configured for direct wireless communication with the vehicle transceiver to engage a docking station;

aggregating vehicle information and drone information to update the drone route to minimize a cost function;

update the drone route based at least in part on the destination point and the vehicle location relative to the drone location; and providing the updated drone route to the drone using the network.

16. The method of claim 15, further comprising:

providing traffic information to at least one of the vehicle transceiver and drone transceiver using the network, wherein the traffic information indicates traffic congestion along the vehicle route.

17. The method of claim 15, further comprising:

updating at least one of the vehicle route and drone route based at least in part on traffic information, and communicating the updated at least one of the vehicle route and drone route to at least the vehicle.

18. The method of claim 15, further comprising:

projecting an estimated trajectory of the vehicle route with a neural network; and changing the drone route based in part on the estimated trajectory of the vehicle.

\* \* \* \* \*